United States Patent [19]
Narikawa et al.

[11] Patent Number: 5,119,317
[45] Date of Patent: Jun. 2, 1992

[54] ROUTING METHOD AND SYSTEM

[75] Inventors: Noboru Narikawa, Yokohama; Setsuo Yamamoto, Tokyo; Takuji Takayama, Yokohama; Norio Sasaki, Tokyo, all of Japan

[73] Assignee: Kabushiki Kaisha Toshiba, Kawasaki, Japan

[21] Appl. No.: 323,832

[22] Filed: Mar. 15, 1989

[30] Foreign Application Priority Data

Mar. 16, 1988 [JP] Japan ................ 63-60248
Sep. 9, 1988 [JP] Japan ................ 63-225917

[51] Int. Cl.⁵ .................................. G06F 15/20
[52] U.S. Cl. ...................... 364/512; 364/491
[58] Field of Search .......... 364/488, 489, 490, 491, 364/512, 505, 521

[56] References Cited

U.S. PATENT DOCUMENTS

| | | | |
|---|---|---|---|
| 4,615,011 | 9/1986 | Linsker | 364/491 |
| 4,642,780 | 2/1987 | Thomson | 364/512 |
| 4,752,887 | 6/1988 | Kuwahara | 364/488 |
| 4,777,606 | 10/1988 | Fournier | 364/489 |
| 4,831,546 | 5/1989 | Mitsuta et al. | 364/512 |
| 4,852,015 | 7/1989 | Doyle, Jr. | 364/488 |
| 4,855,929 | 8/1989 | Nakajima | 364/488 |
| 5,021,968 | 6/1991 | Ferketic | 364/512 |

FOREIGN PATENT DOCUMENTS 60-79470 5/1985 Japan .
61-70665 4/1986 Japan .
63-118877 5/1988 Japan .

*Primary Examiner*—Parshotam S. Lall
*Assistant Examiner*—M. J. Zanelli
*Attorney, Agent, or Firm*—Oblon, Spivak, McClelland, Maier & Neustadt

[57] ABSTRACT

A routing system for finding a route which satisfies predetermined limiting conditions in a space of an object space with an aid of a computer, includes a first processor for dividing at least the object area into a plurality of areas and extracting a divided area or divided areas which satisfy the predetermined limiting conditions from the plurality of divided areas, and a second processor for further dividing the divided area or divided areas extracted by the first processor into a plurality of subdivided areas and extracting a subdivided area or subdivided areas which satisfy the predetermined limiting conditions from the plurality of subdivided areas.

13 Claims, 20 Drawing Sheets

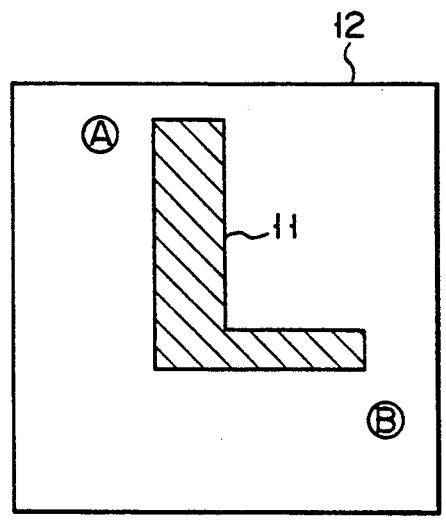
F I G. 4
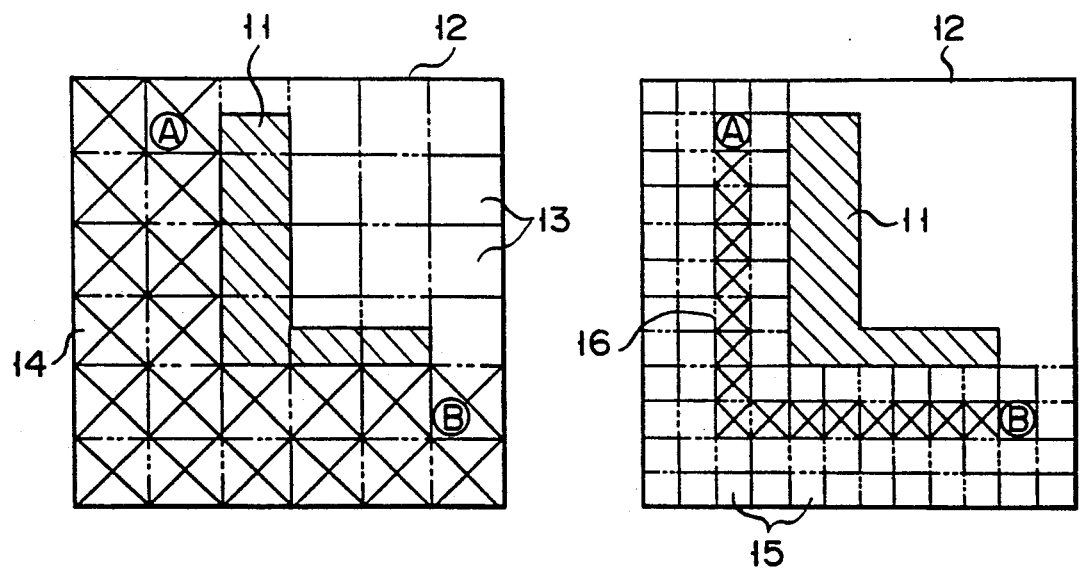
F I G. 5          F I G. 6

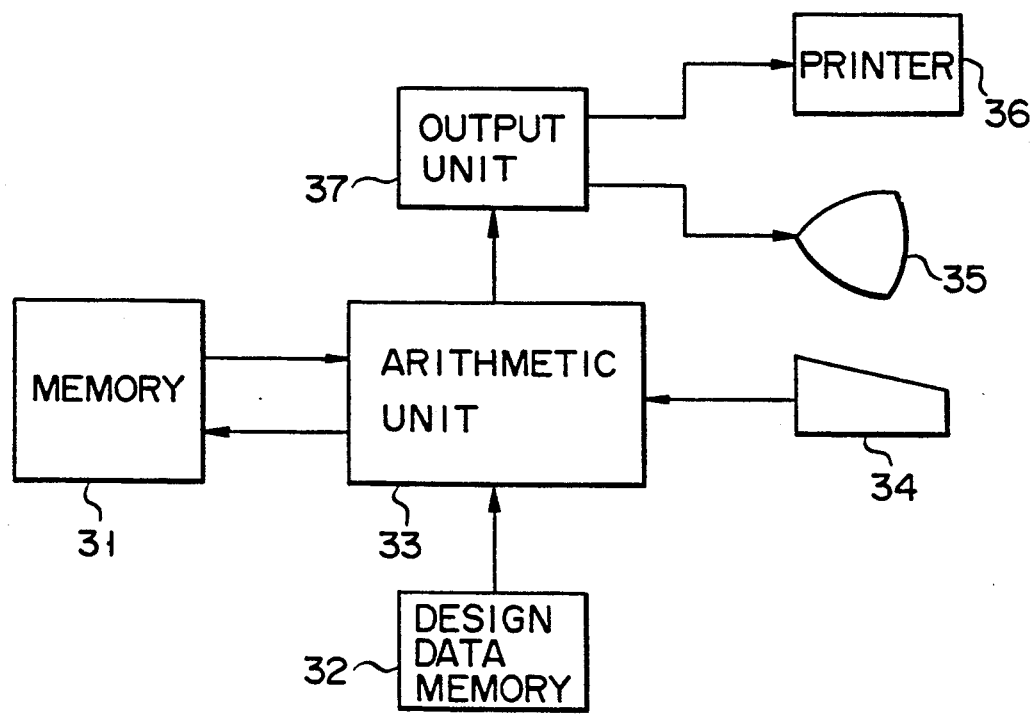
F I G. 9
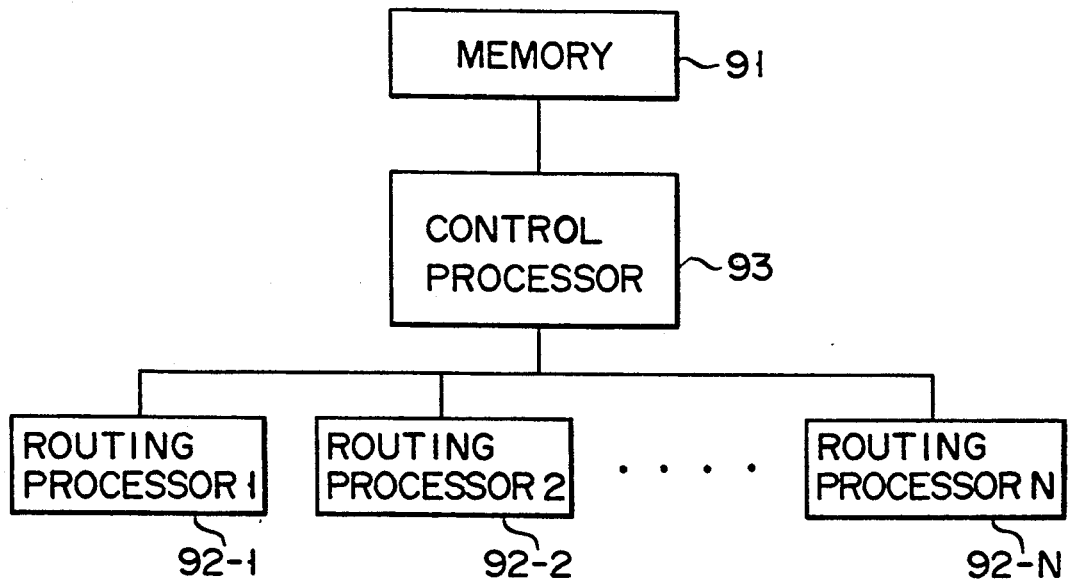
F I G. 30

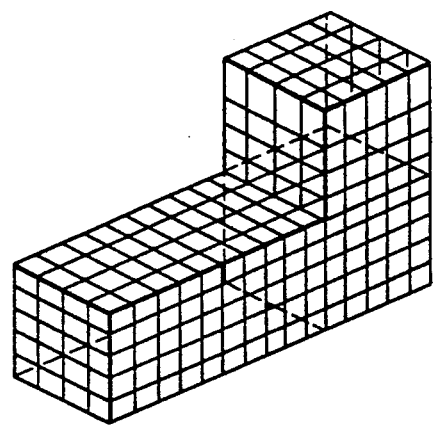
F I G. 14
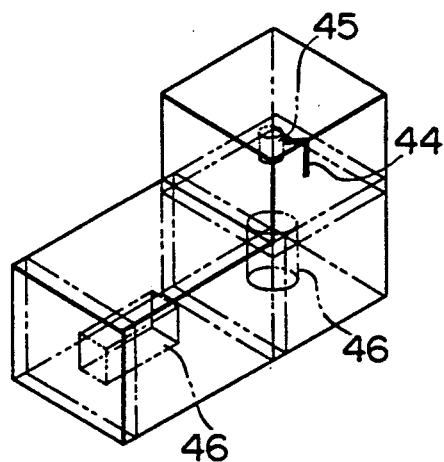
F I G. 15
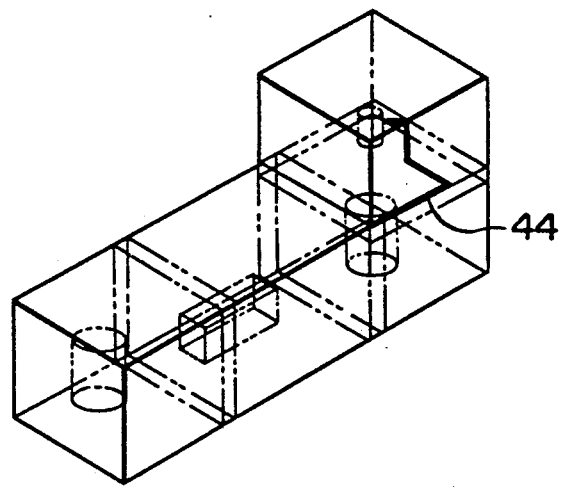
F I G. 16

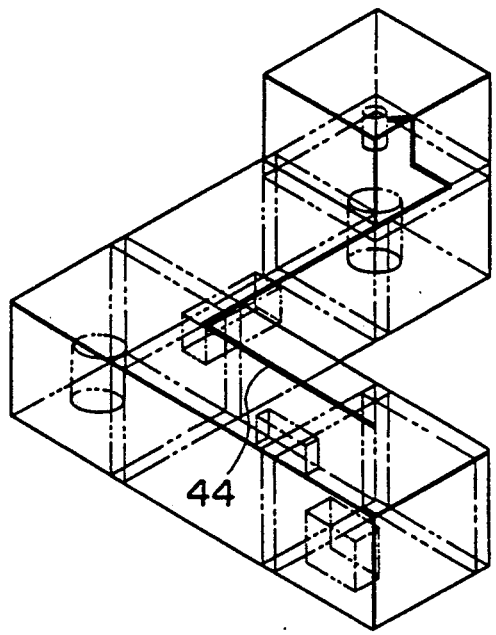
F I G. 17
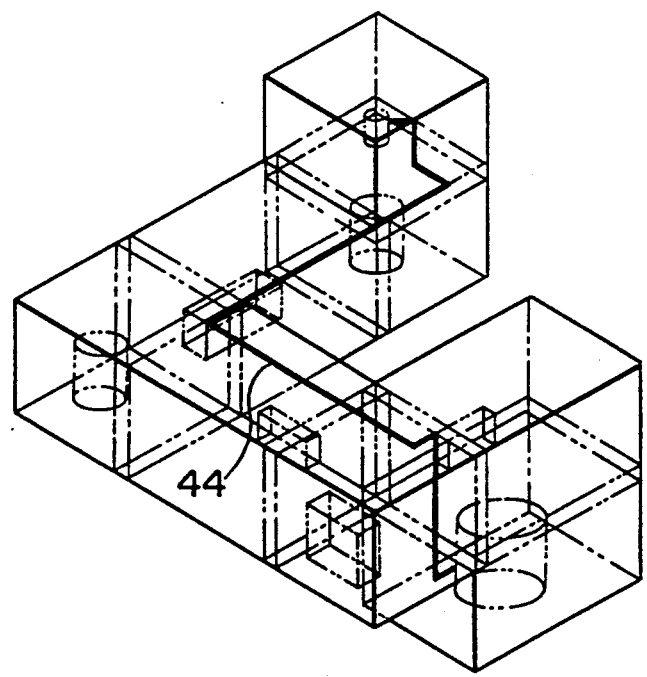
F I G. 18

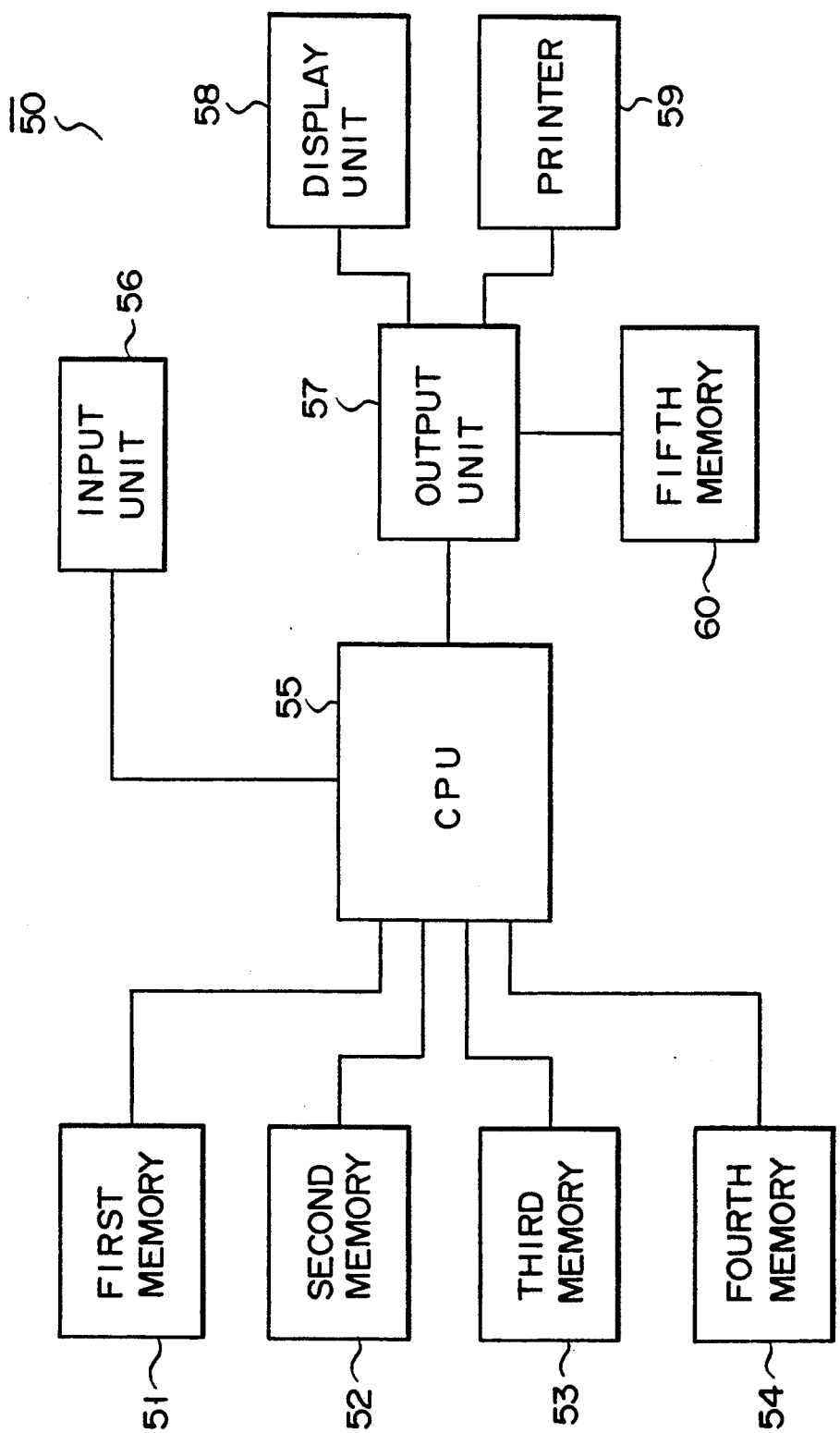
F I G. 21

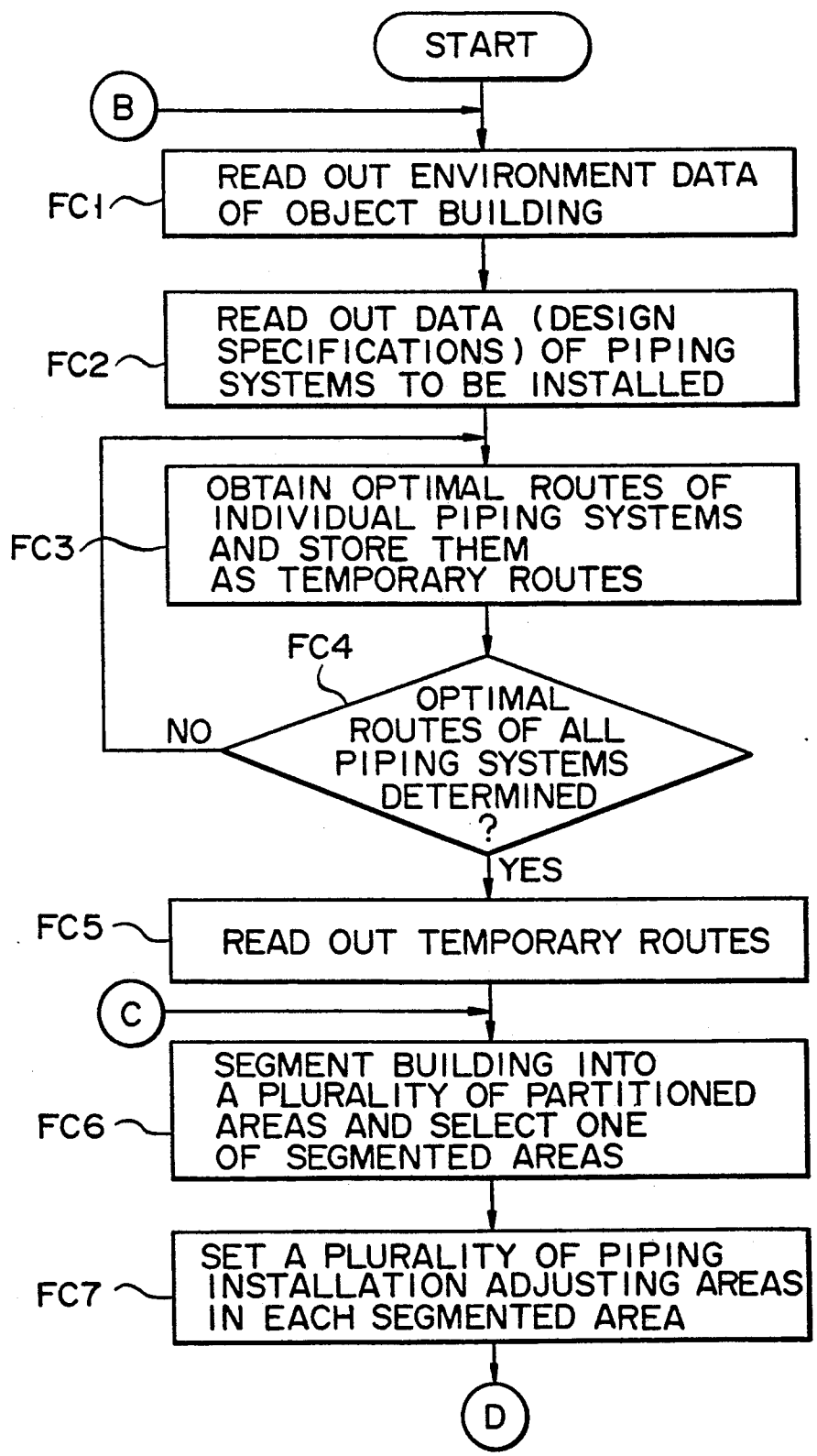
F I G. 22A

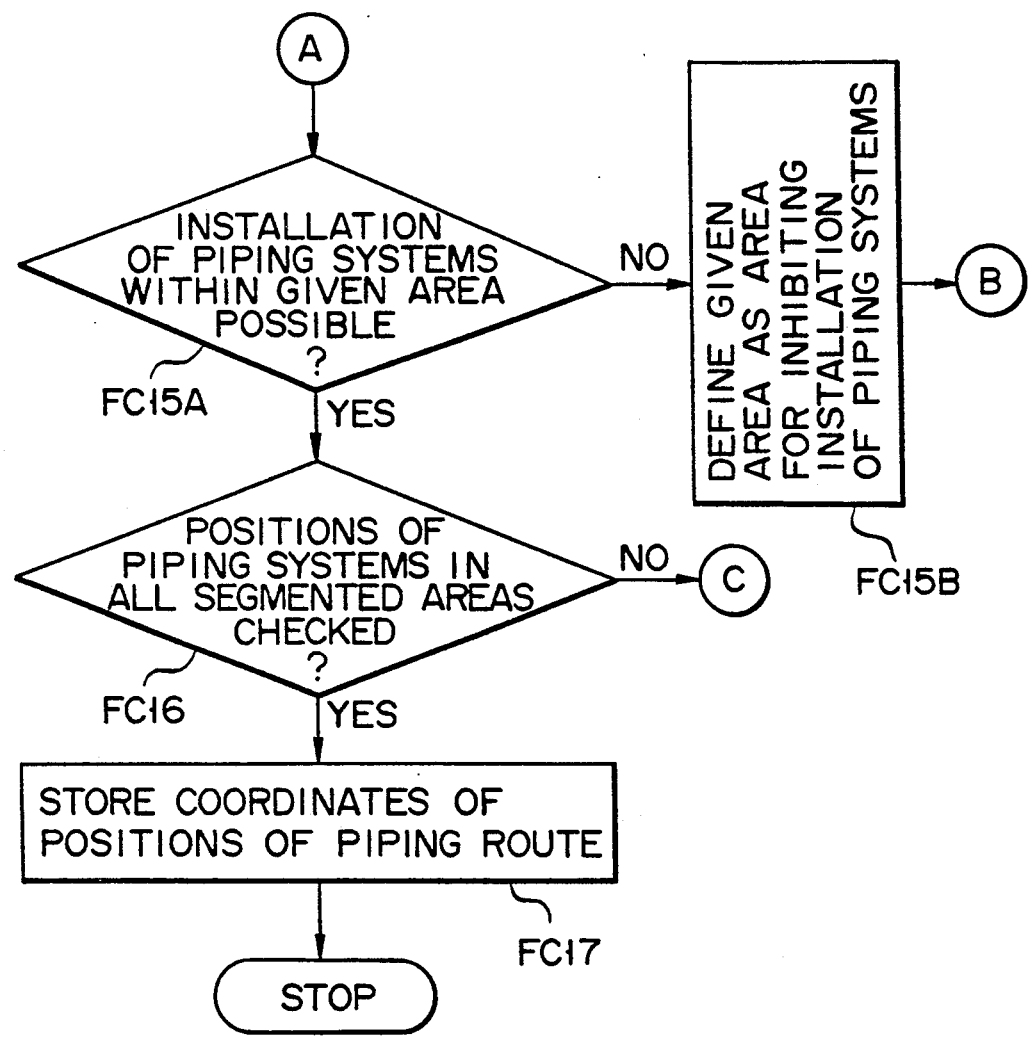
F I G. 23

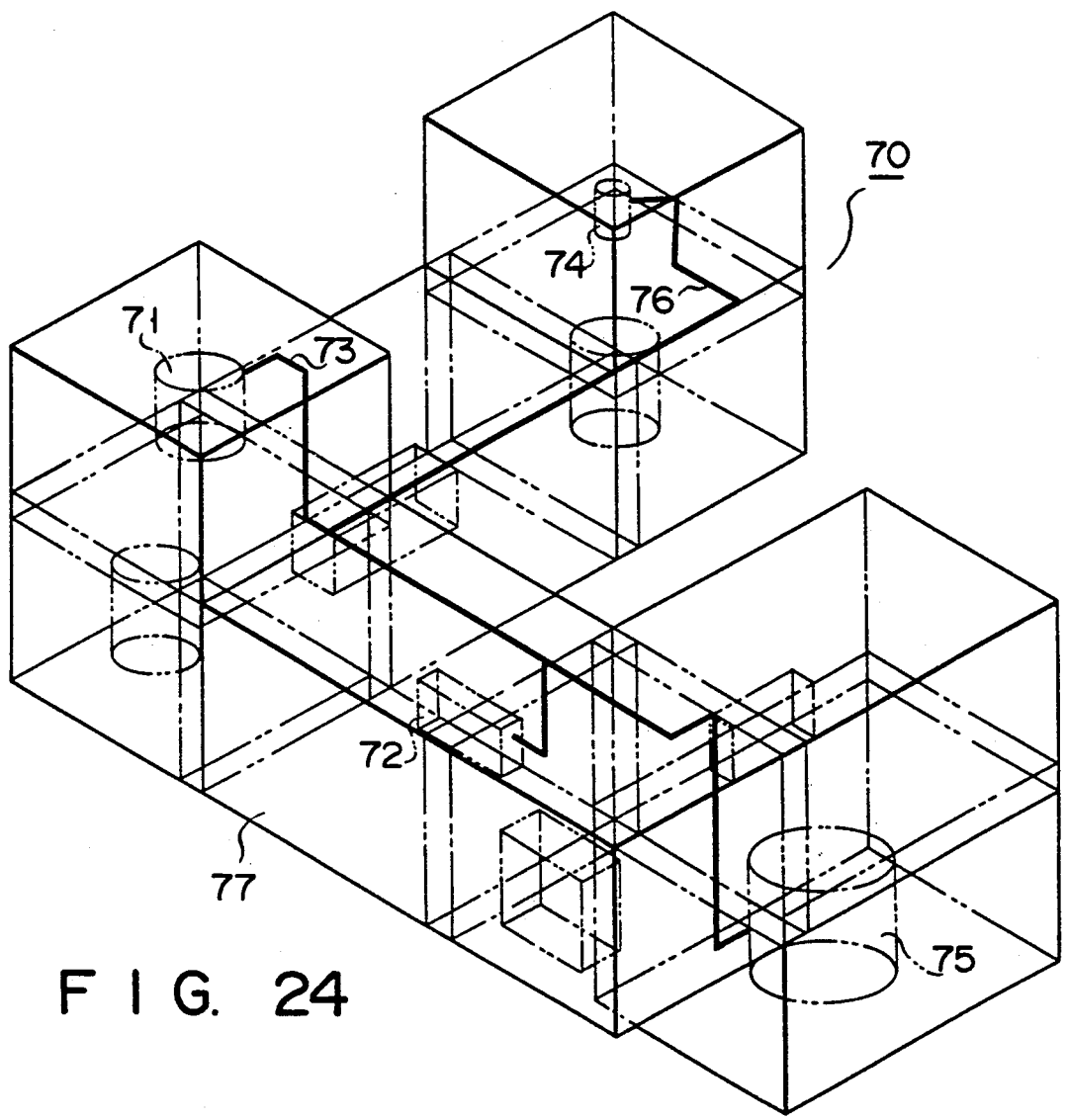
F I G. 24
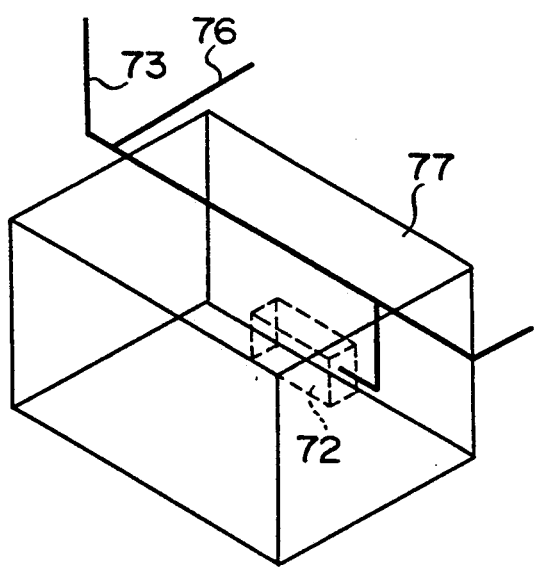
F I G. 25

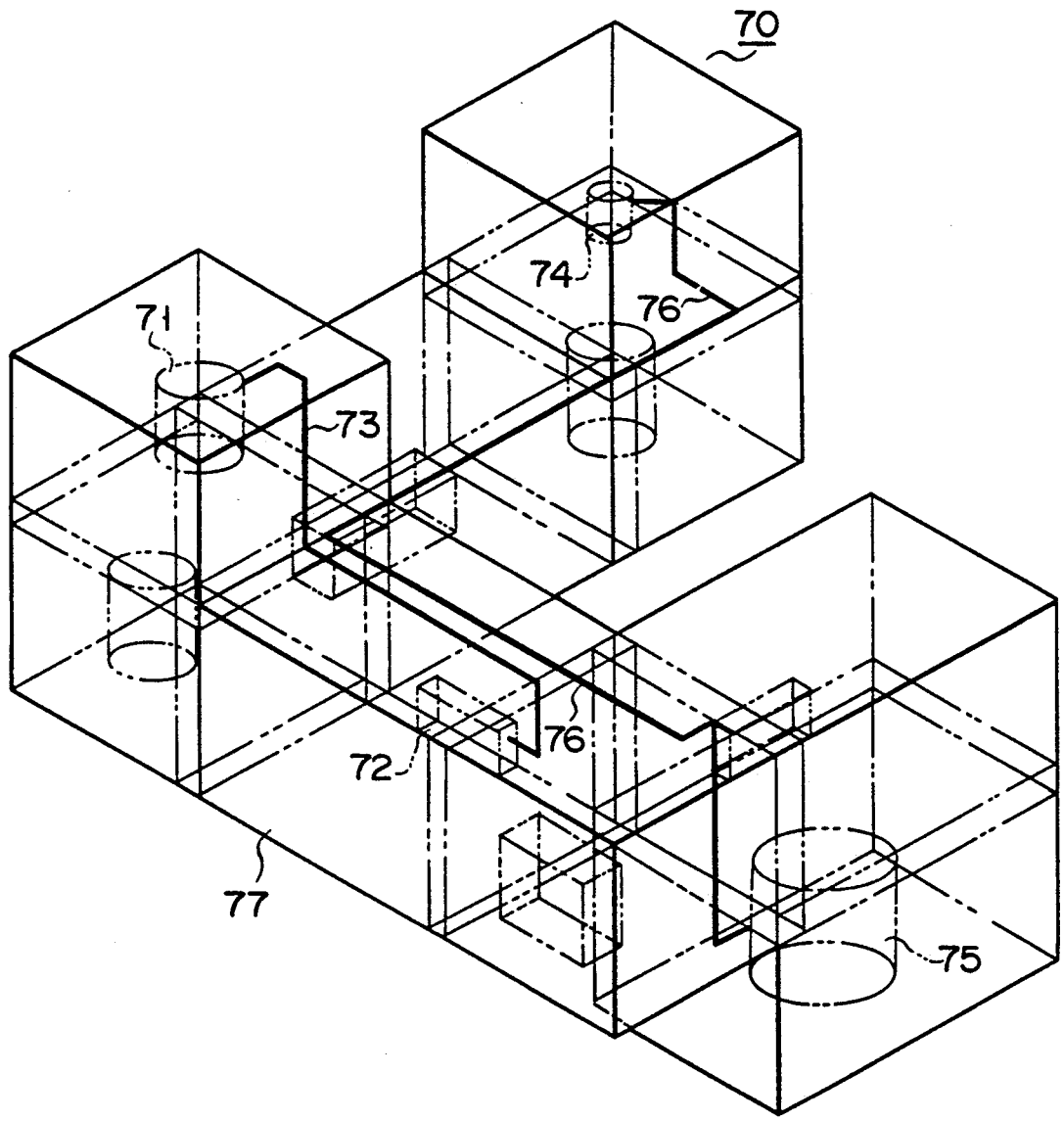
F I G. 29

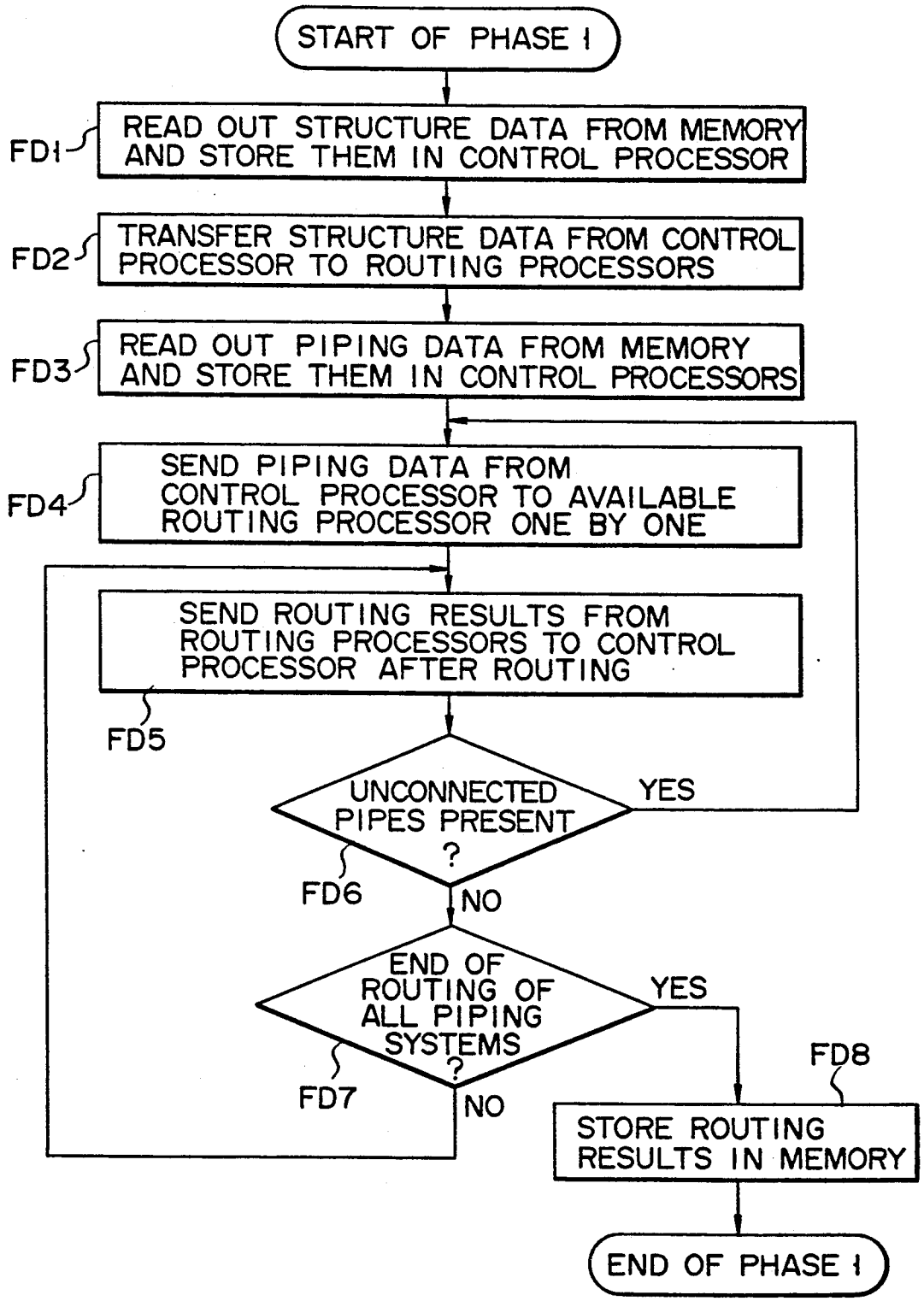
F I G. 31

ROUTING METHOD AND SYSTEM

BACKGROUND OF THE INVENTION

1. Field of the Invention

The present invention relates to a computer-aided routing method and an apparatus therefor which are used in piping in plants, layout design of ducts and rest rooms, and wiring design of electronic circuits.

2. Description of the Related Art

In recent years, computer-aided design (CAD) systems have been used to shorten time for designing various plants and equipment and reduce labor. Some conventional CAD systems include a routing system for aiding design of routing, i.e., paths in piping design in plants, layout design of equipment, or wiring design of electronic circuits. A typical routing system is described in Japanese Patent Disclosure (Kokai) No. 60-79470 or 62-114061. When piping design in plants by a routing system is exemplified, the routing system has a function of finding best routing, i.e., best piping in a best area in a plant, with an aid of a computer in consideration of restriction conditions such as conditions defined by pipes used, buildings of plants, safety, cost, and the like, and a function of displaying the routing result and drafting a routing plan.

In a conventional routing system, a specific target routing area is found by a general technique shown in a flow chart in FIG. 1. More specifically, when an operator inputs an object area name, a size of a specific target space, and limiting conditions and energizes the routing system, space data of an object area is read out from a memory, and the object area is divided into a plurality of small areas (SA1). The space data read out from the memory are assigned to the corresponding divided areas (SA2), a divided area or divided areas which coincide with the specific target area are found using a routing method such as an A-star algorithm or a lattice development method (maze method) (SA3 and SA4).

The above processing in a two-dimensional space will be briefly described below. As shown in FIG. 2, assume that an object area 1 is selected and that specific piping between points A and B in the object area 1 is ordered. Under these assumptions, the object area 1 is divided into small areas in a mesh-like manner. The length and width of each divided area 2 are determined by a maximum outer diameter of piping. Space data, i.e., data of an obstacle 3, read out from the memory are assigned to the respective divided areas 2. A routing processor extracts the divided areas 4 continuous from the point A to the point B to perform target piping without being interfered by the obstacle 3. The resultant route is the final piping route.

In the conventional routing system employing the above technique, however, when the object area is increased or the specific area size is small, the number of divided areas constituting the object area is very large. As a result, a required memory capacity is greatly increased, and the processing time is prolonged accordingly.

In order to eliminate the above drawbacks, the following conventional methods are proposed: (a) a method of appropriately selecting a start point; (b) a double developing method in which routing is started from both ends of a route to be obtained; (c) a method of appropriately limiting a routing area; and (d) a method of giving a higher priority to a direction closer to a target point during routing. None of these conventional methods, however, cannot greatly reduce the memory capacity.

As described above, in the conventional routing systems, when the object area is increased and the size of the divided areas corresponding to a routing target is decreased, the memory capacity must be increased and the processing time is undesirably prolonged.

SUMMARY OF THE INVENTION

It is, therefore, an object of the present invention to provide a routing method and an apparatus therefor wherein routing of a large object area can be performed with a limited memory capacity within a short period of time.

According to an aspect of the routing system of the present invention, an object area is divided into a plurality of large areas, and a divided area or divided areas which can coincide with a specific target space area are selected from the divided areas of the object area. The selected divided areas are further divided, i.e., subdivided to select areas from the subdivided areas to constitute the specific target space area. The object area is sequentially narrowed by the same procedures as described above. Finally, the specific target space area is determined.

According to a second aspect of the routing system, based on the first aspect described above, a temporary end point is set in an arbitrary one of the selected divided areas, and each of the divided areas continuous to the end point is subdivided into a plurality of subdivided areas. A set of subdivided areas which can be the specific target space area and are continuous to the temporary end point are selected to sequentially determine an area reaching the temporary end point or an intermediate area. As a result, one specific target space area is determined.

The basic flow of routing in the routing systems according to the first and second aspects is as follows. The operator inputs an object area name, a size of a specific target space, and limiting conditions and energizes the system, object area data is read out from the memory, and the object area is divided into a plurality of large areas. The readout space data from the memory are assigned to the respective divided areas, and a divided area or divided areas which can constitute the specific target space area are determined by using a conventional routing technique. The divided area is then subdivided into subdivided areas, and a subdivided area or subdivided areas which can constitute the specific target space are selected, thereby determining the area or areas constituting the specific target space.

In the routing system described above, after the object area is divided into large divided areas, and routing is performed, the object area is then limited. Routing of the limited area is repeated. Therefore, high-precision routing can be performed for a large object area with a small memory capacity. In addition, the routing time can also be shortened. In this system, after the object area is divided into large divided areas and routing of the divided areas is performed, the object area is then limited and routing of the limited object area is performed, thereby further reducing the memory capacity.

In a routing system according to a third aspect of the present invention, when a plurality of routes which satisfy predetermined limiting conditions in the space of the object area are to be searched, in the first phase, optimal routes for the plurality of routes are independently obtained in the entire object area as the route passing area through which the plurality of routes can pass. In the second phase, the route passing area is divided into a plurality of segmented areas. A relative positional relationship of all routes included in each segmented area and satisfying the predetermined limiting conditions is obtained. Positions, i.e., coordinates, of all the routes within each segmented area are determined. These operations are repeated for all segmented areas, thereby determining each route.

In a routing system according to a fourth aspect of the present invention, the operations in the first phase are performed by parallel processing.

The basic flow of routing in the routing systems according to the third and fourth aspects is as follows. In the first phase, optimal routes of a plurality of piping routes to be arranged in the entire route passing area in the space of the object area are independently obtained. Therefore, the optimal routes may interfere with each other at some locations. In this case, no specific consideration is taken for the interference between the optimal routes. The optimal piping routes are temporarily stored in a memory. In the second phase, the entire route passing area is segmented into a plurality of segmented areas. All optimal piping routes located within each segmented area are read out from the memory and are rearranged by using the routes and their attributes in accordance with a knowledge data base created in advance on the basis of knowledge of a designer. In this case, a relative positional relationship of all combinations of routes which satisfy the limiting conditions is obtained. The coordinate values of all piping routes within all the segmented areas are determined on the basis of the relative positional relationship.

An evaluation in units of segmented areas and a total evaluation of all the segmented areas can be performed to achieve well-balanced routing.

BRIEF DESCRIPTION OF THE DRAWINGS

FIGS. 4, 5, and 6 are views for explaining the principle of operation of a routing system according to a first embodiment of the present invention;

FIG. 9 is a block diagram showing the routing system according to the first embodiment of the present invention;

FIGS. 12, 13, 14, 15, 16, 17, and 18 are views for supplementary explanation of the operation of the system shown in FIGS. 11, 19, and 20;

FIG. 21 is a block diagram showing a computer-aided routing system according to a third embodiment of the present invention;

FIGS. 22A, 22B, and 23 are flow charts showing processing procedures associated with routing in the system in FIG. 21;

FIG. 24 is a perspective view of a building as an object area for routing in the system of FIG. 21;

FIG. 25 is a perspective view showing segmented areas in FIG. 24;

FIG. 29 is a perspective view of the building of FIG. 24 after the piping positions in the building are determined;

FIG. 30 is a block diagram showing an arrangement of a routing system according to a fourth embodiment of the present invention; and FIG. 31 is a flow chart showing processing of a first phase in a routing technique in the system shown in FIG. 30.

DETAILED DESCRIPTION OF THE PREFERRED EMBODIMENTS

The basic principle of routing systems according to first and second embodiments of the present invention will be described below.

Figure 1:
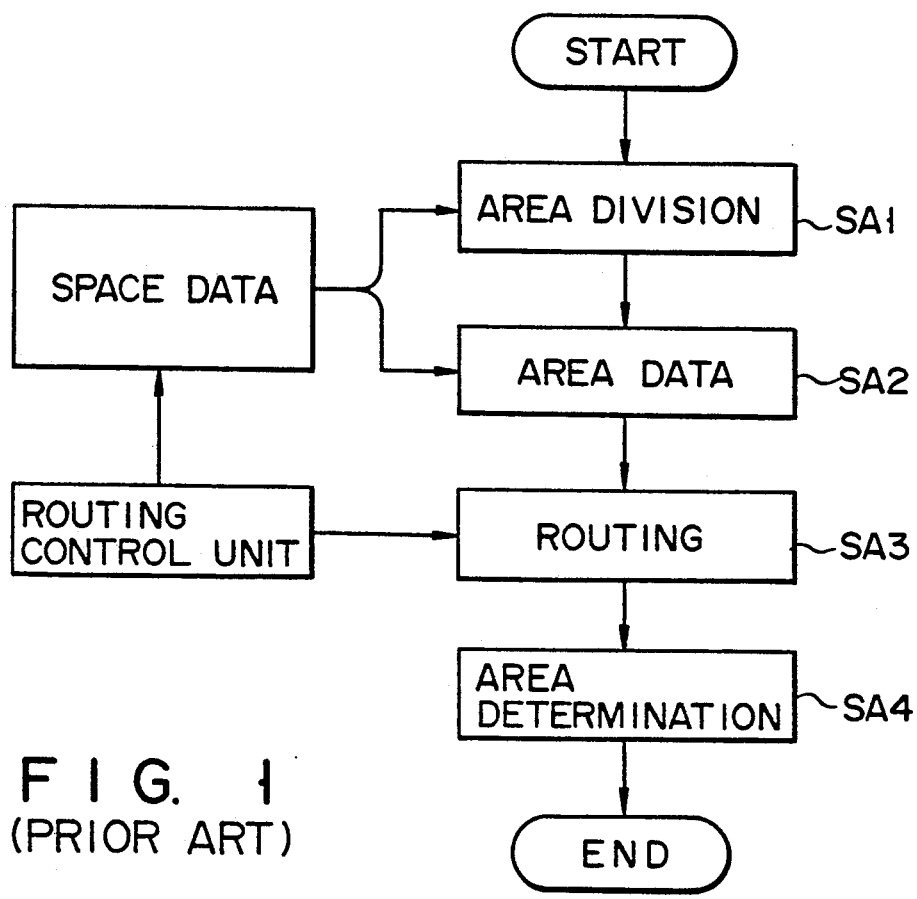
FIG. 1 is a flow chart showing routing in a conventional routing system.
Figure 2:
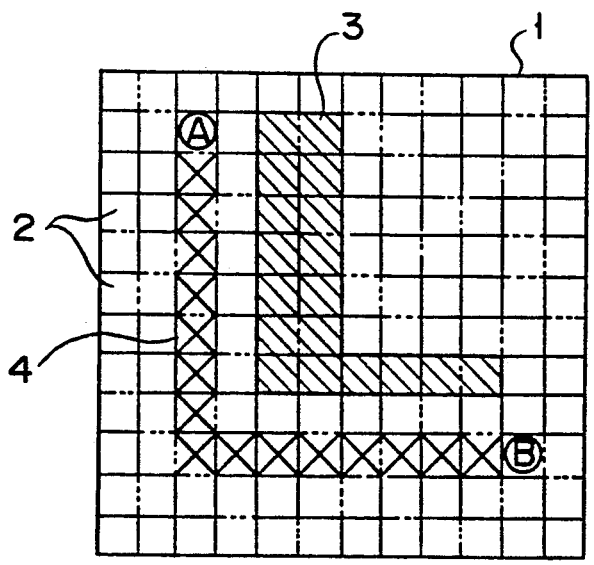
FIG. 2 is a view for supplementary explanation of an operation in FIG. 1.
Figure 3:
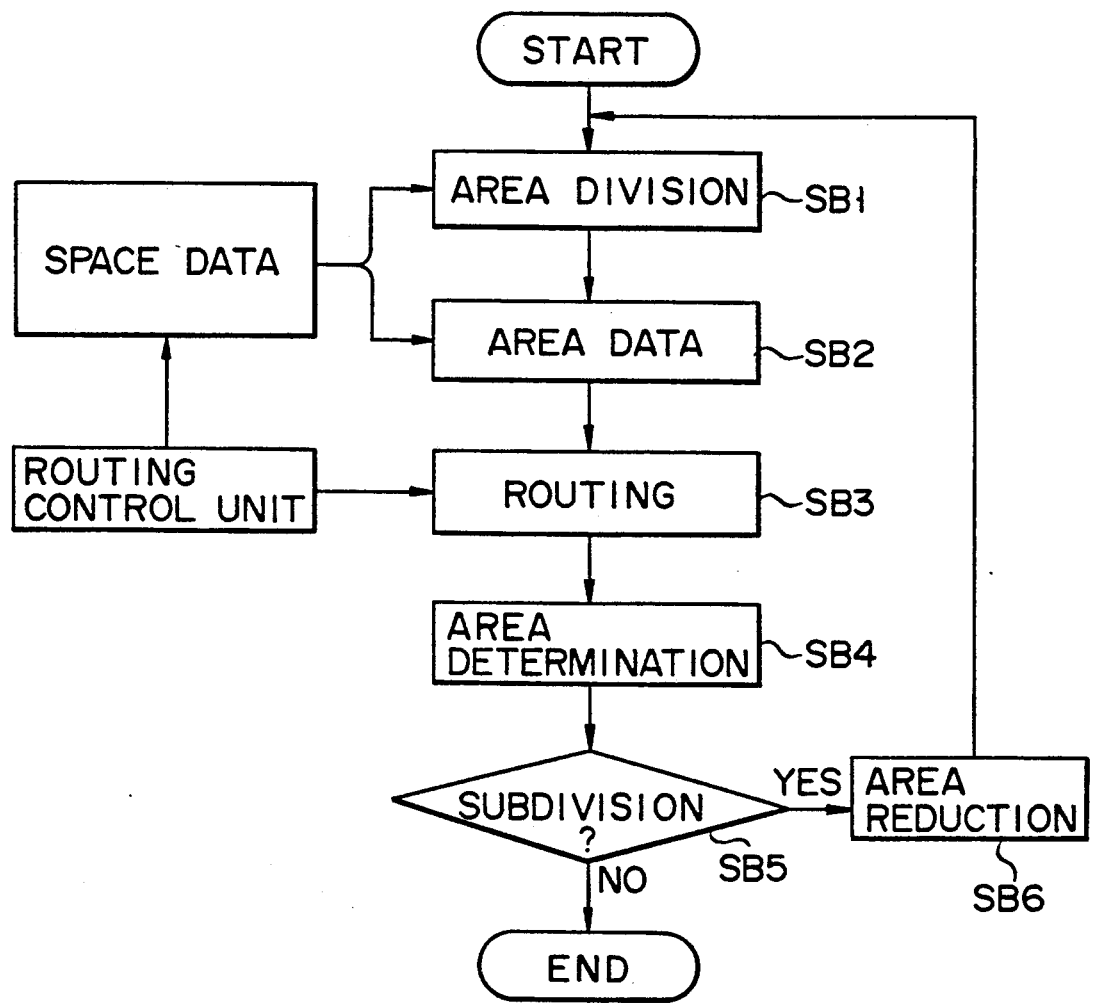
FIG. 3 is a flow chart showing a principle of routing operation in a routing system according to the present invention.

The basic flow of routing is shown in FIG. 3. When an operator inputs an object area name, a size of a specific target space, limiting conditions, and the like, and processing is started, object area data is read out from a memory upon operation of a route control unit, and the object area is divided into a plurality of areas (SB1). The space data read out from the memory are assigned to the respective divided areas (SB2). A divided area or divided areas which can constitute a route of the specific target space are determined using a known routing technique (SB3 and SB4). The determined area or areas are further divided to obtain subdivided areas, and a subdivided area or subdivided areas which constitute the specific target space are selected by the above technique (SB5 and SB6), thereby finally determining areas of a specific target route.

An operation of the first embodiment in a two-dimensional space according to the present invention will be briefly described. For example, as shown in FIG. 4, an object area 12 having an obstacle 11 at its center is selected, and an order is made to perform predetermined piping which connects points A and B in FIG. 4. The object area 12 is roughly divided in a mesh-like manner, as shown in FIG. 5. The length and width of each divided area 13 are determined to be values larger than that of a maximum outer diameter of piping. Data of the obstacle 11 which are read out from the memory are assigned to the corresponding divided areas 13. The routing control unit extracts areas in which target piping from the point A to the point B can be made without being interfered by the obstacle, that is, divided areas 14 indicated by marks "X" in FIG. 5. Subsequently, only the divided areas 14 are subdivided in a mesh-like manner, as shown in FIG. 16. The length and width of subdivided areas 15 are determined to be equal to or slightly larger than the maximum outer diameter of piping. The data of the obstacle 11 which are read out from the memory are assigned to the corresponding subdivided areas 15. The routing control unit extracts areas in which target piping from the point A to the point B can be performed without being interfered by the obstacle 11, that is, subdivided areas 16 indicated by marks "X" in FIG. 6. These subdivided areas 16 are determined to constitute a last piping layout route.

Figure 7:
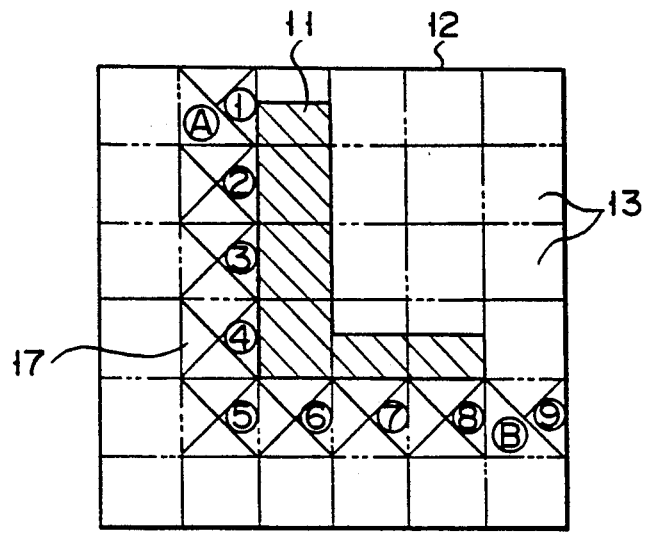
FIGS. 7, 8A, 8B, and 8C are views for explaining the principle of operation of a routing system according to a second embodiment of the present invention.
Figures 8A, 8B, 8C:
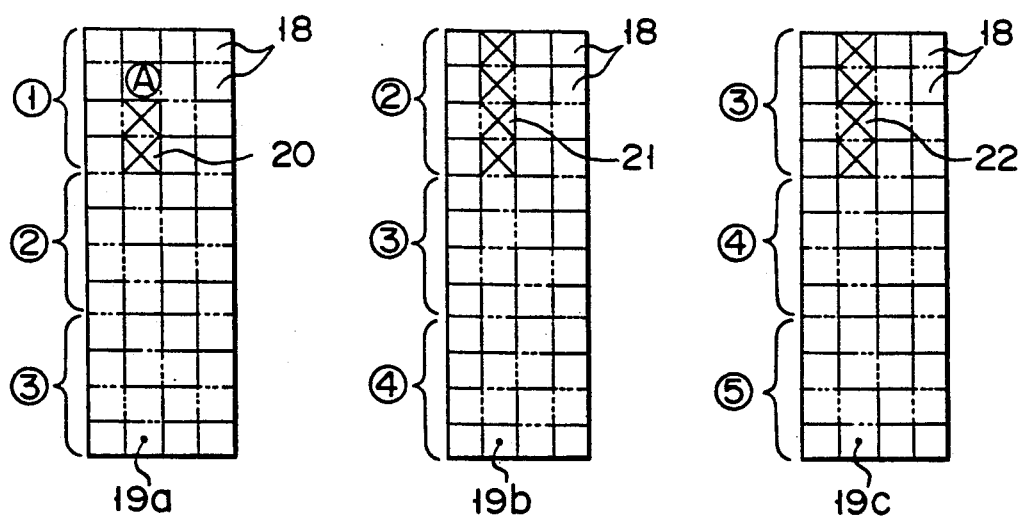

In the routing system according to the second embodiment of the present invention, an object area 12 is divided into large areas, as shown in FIG. 5. The routing control unit extracts areas in which target piping from the point A to the point B can be performed without being interfered by an obstacle 11, i.e., divided areas 17 indicated by marks "X" in FIG. 7. First three divided areas (1), (2), and (3) (FIGS. 8A) of the divided areas (1) to (9) constituting the divided areas 17 from the point A are extracted. These three divided areas (1) to (3) are further divided into subdivided areas 18. The length and width of each subdivided area 18 are equal to or slightly larger than the maximum outer diameter of piping. A temporary end point 19a is set in the third divided area (3). The temporary end point 19a is selected at a geometric position nearest to the point B in principle. The routing means extracts subdivided areas of the first divided area (1) in which piping is possible toward the end point 19a. That is, the routing means extracts subdivided areas 20 indicated by marks "X" in FIG. 8A. Subsequently, of the divided areas (1) to (9) constituting the divided areas 18, only the second to fourth divided areas (2), (3), and (4) are extracted, as shown in FIG. 8B. The three divided areas (2) to (4) are further divided into subdivided areas in the same manner as described above. A temporary end point 19b is set in the fourth divided area (4). The routing control unit extracts subdivided areas of the divided area (2) in which piping is possible toward the temporary end point 19b. That is, the routing control unit extracts subdivided areas 21 indicated by marks "X" in FIG. 8B. The piping route areas are sequentially determined in the same manner as described above, thereby finally determining the subdivided areas 16 shown in FIG. 6.

As is apparent from the above description, in the routing system of the present invention, the large object area need not be divided into areas having a size corresponding to the specific target route space from the beginning. Therefore, routing of a large object area can be performed with a limited memory area.

FIG. 9 is a block diagram of a routing system according to the first embodiment based on the above principle.

This system comprises a memory 31 for storing space data (data of sizes and positions of obstacles) of a plurality of object areas and attributes of each divided area of the object area, a design data memory 32 for storing design reference data, an arithmetic unit 33 for reading out necessary data from the memories 31 and 32 and performing necessary arithmetic operations, an input unit 34 for causing the operator to input a necessary command to the arithmetic unit 33, and an output unit 37 for causing a display unit 35 to display data from the arithmetic unit 33 or a printer 36 to print out the data from the arithmetic unit 33.

In the routing system having the above arrangement, the space area of the specific target route is searched from the object area by the following processing procedures. An operation for searching an area for installing specific piping in a given object area will be exemplified.

Limiting conditions such as an object target area name, purposes and types of piping to be installed, and coordinate values of the start and end points within the object area are input through the input unit 34.

Figure 10:
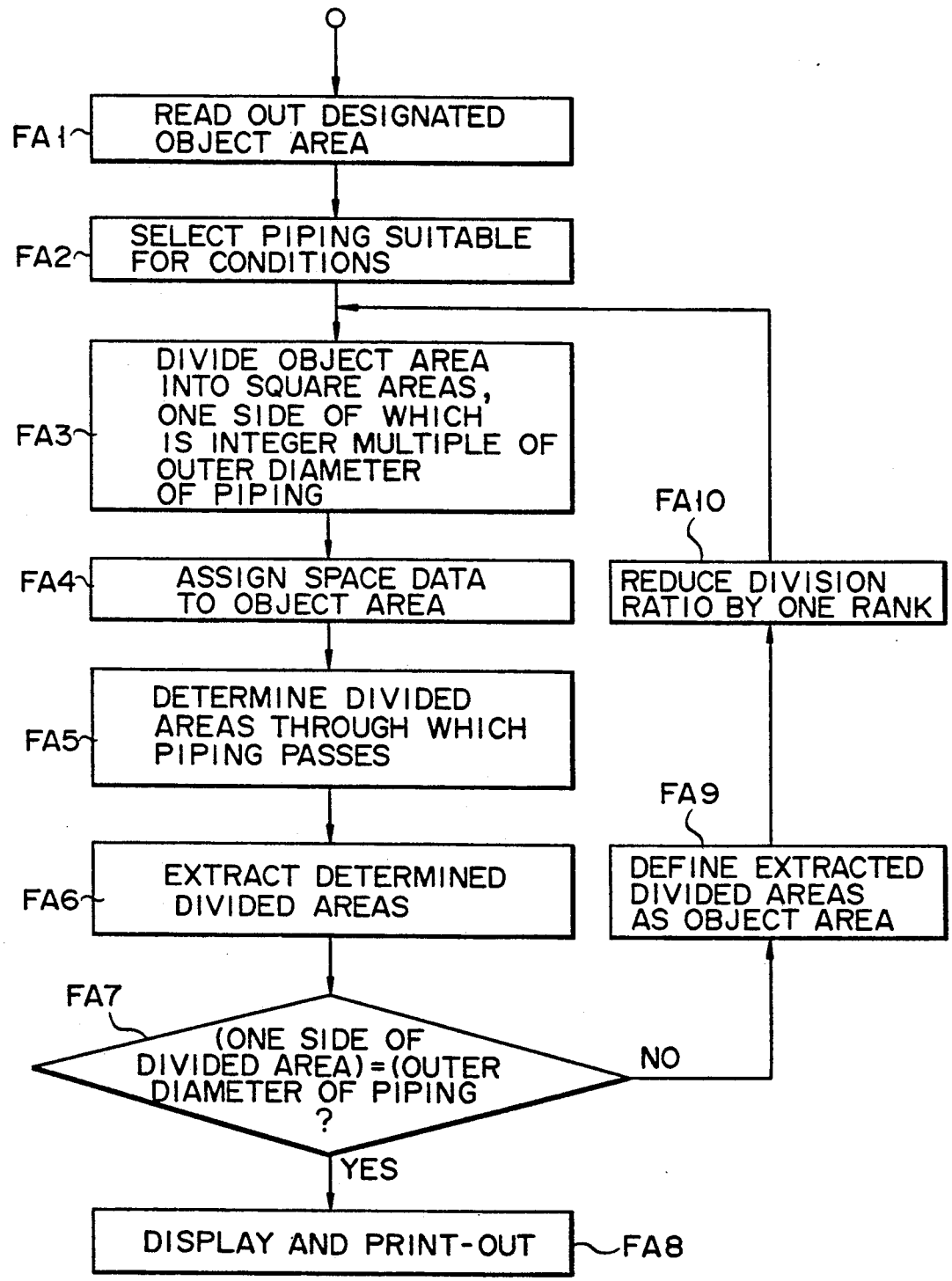
FIG. 10 is a flow chart for explaining an operation of the system shown in FIG. 9.

When the input operations are completed and processing is started, the arithmetic unit 33 is operated in accordance with programs stored therein to execute processing by the procedures shown in the flow chart of FIG. 10.

FA1: Designated object area data is read out from the memory 31.

FA2: Piping data which satisfies the designated conditions is selected from the data stored in the design data memory 32. By this selection, an outer diameter of piping is determined.

FA3: The readout object area is divided into square areas (or cubic areas), one side of which is an integer multiple (e.g., 10 times) of the outer diameter of piping.

FA4: The space data of the respective divided areas are read out from the memory 31 and are assigned to the corresponding divided areas.

FA5: The divided areas through which a route can pass from the start point to the end point are searched according to a routing technique such as an A-star algorithm or lattice development method. In this case, divided areas which can reduce expenses for supports in terms of route passing cost are selected, thereby selecting divided areas which are continuous from the start point to the end point.

FA6: Data of the selected divided areas are extracted.

FA7: It is determined whether one side of each divided area constituting the extracted divided areas is equal to the outer diameter of piping. If so, this area is defined as an area through which piping can pass, and the flow advances to step FA8 to display and print out the position of this area. However, if one side of each divided area constituting the extracted divided areas is not equal to the outer diameter of piping, the flow advances to step SFA9.

FA8: The positions of the extracted divided areas are displayed and printed out.

FA9: The extracted divided areas are defined to constitute a new object area.

FA10: A division ratio is reduced by one rank, e.g., reduced to 5 times, and the flow returns to step FA3.

The operations in steps FA3 to FA7 are repeated for the designated divided areas.

The operations in step FA3 to FA7 are repeated as described above, and subdivided areas in which piping can be installed under the limited conditions are defined between the start and end points.

The routing system according to the second embodiment of the present invention will be described below.

The system of this embodiment has substantially the same arrangement as in the first embodiment, as shown in the block diagram of FIG. 9. However, the routing procedures of the second embodiment are different from those of the first embodiment. Assume that specific piping is routed in an atomic plan as an object area. Routing processing will be described under this assumption.

Figure 11:
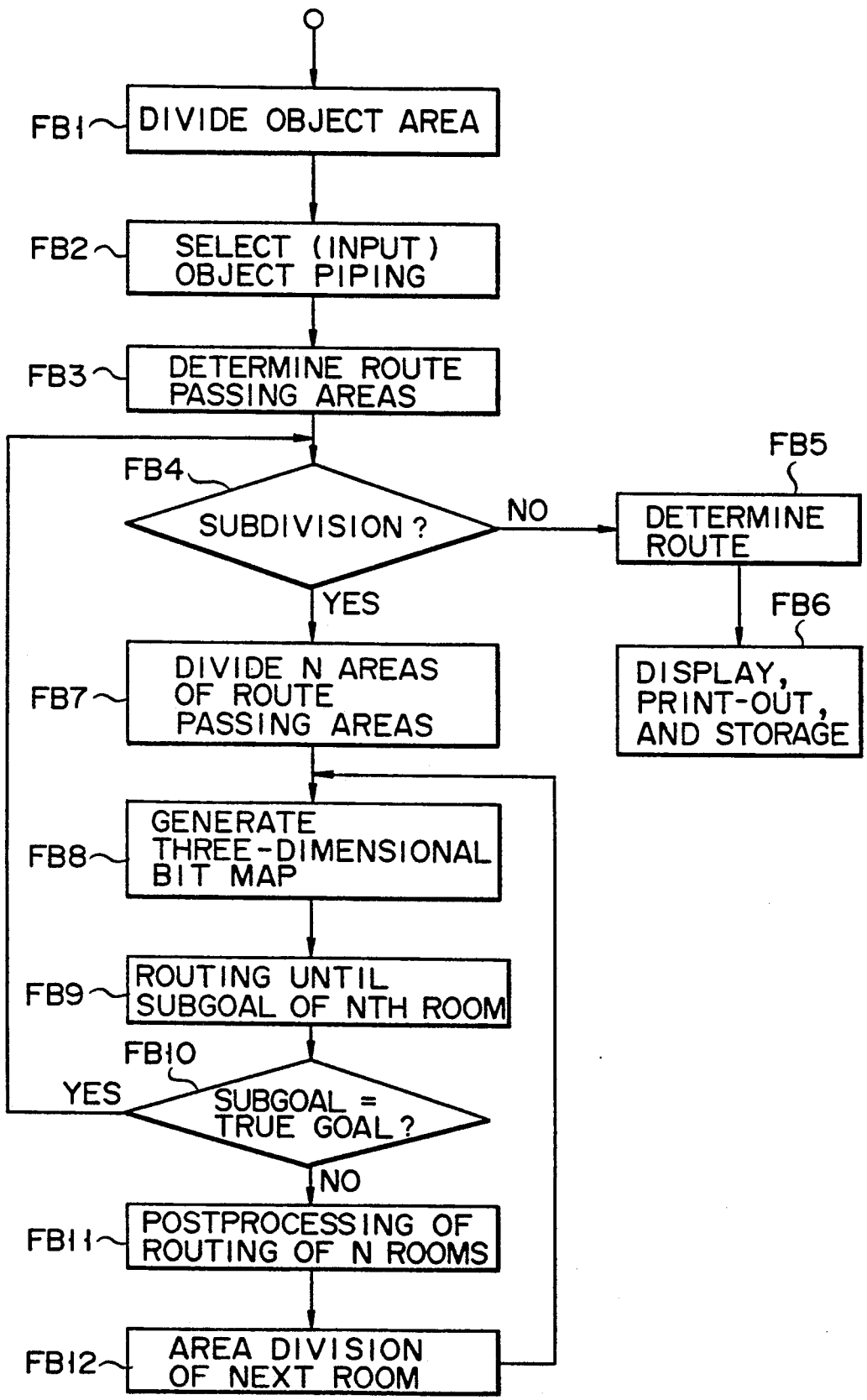
FIGS. 11, 19, and 20 are flow charts for explaining an operation of the routing system according to the second embodiment of the present invention.

Limiting conditions such as an object area name as a target, and purposes and types of piping to be installed are input. When the input operations are completed and processing is started, routing processing is executed by procedures shown in a flow chart of FIG. 11.

Figure 12:
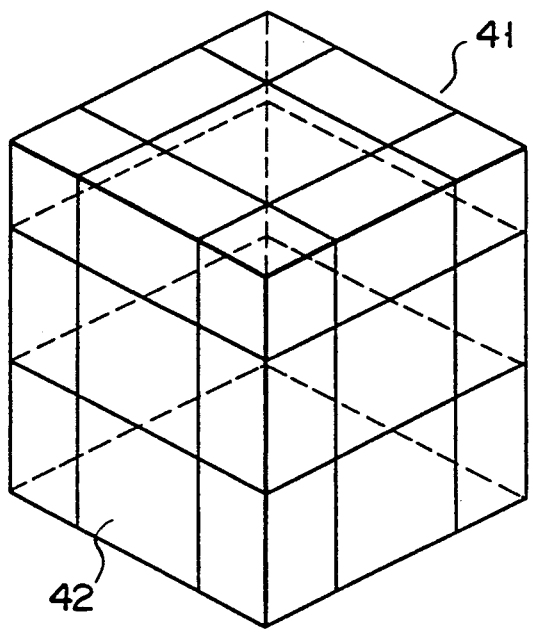

FB1: A designated object area is read out from a memory and is divided into areas (rooms) having identical attributes (radiation levels and safety system separation request). Names of adjacent areas which represent the attributes and the connecting relationship of the rooms are assigned to the corresponding rooms. For example, if an area 41 shown in FIG. 12 is an object area, the object area 41 is divided into a plurality of areas (rooms) 42 in accordance with the above conditions.

FB2: Piping which matches with the conditions is selected. Piping attributes and equipment connected to piping are assigned to the piping in the same manner as in the divided areas 42. Start and end points of piping are determined on the basis of the piping attributes and names of equipment connected thereto.

Figure 13:
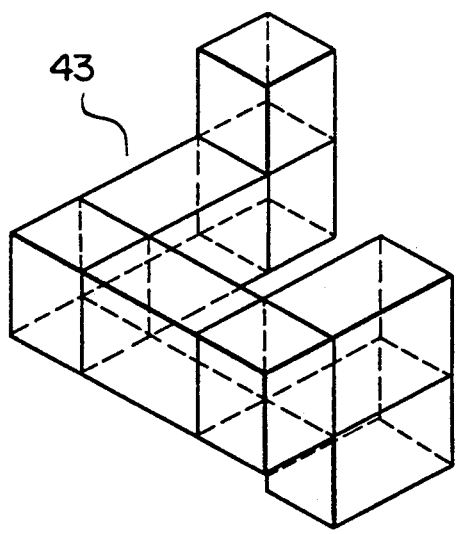

FB3: Continuous route passing areas through which piping can pass by the routing technique such as the A-star algorithm or the lattice development method are selected. FIG. 13 shows route passing areas 43 thus selected by the above routing technique.

FB4: It is determined whether the selected route passing areas 43 are to be further divided. In this case, a determination standard is given to perform a further division when a width or height of each route passing area is, e.g., three times an outer diameter of piping. If the width or height of each route passing area is less than 3 times the outer diameter of piping, the flow advances to step FB5. It is determined in step FB5 that the route is decided. The route areas are displayed, printed out, and stored in a memory. When the width or height of the route passing area is 3 or more times the outer diameter of piping, the flow advances to step FB7.

FB7: Only N (N=3 in this case) divided areas of the selected route passing areas 43 which are designated from the start point are uniformly subdivided into subdivided areas (FIG. 14). In this case, the size of each subdivided area is equal to the outer diameter of piping.

Figure 19:
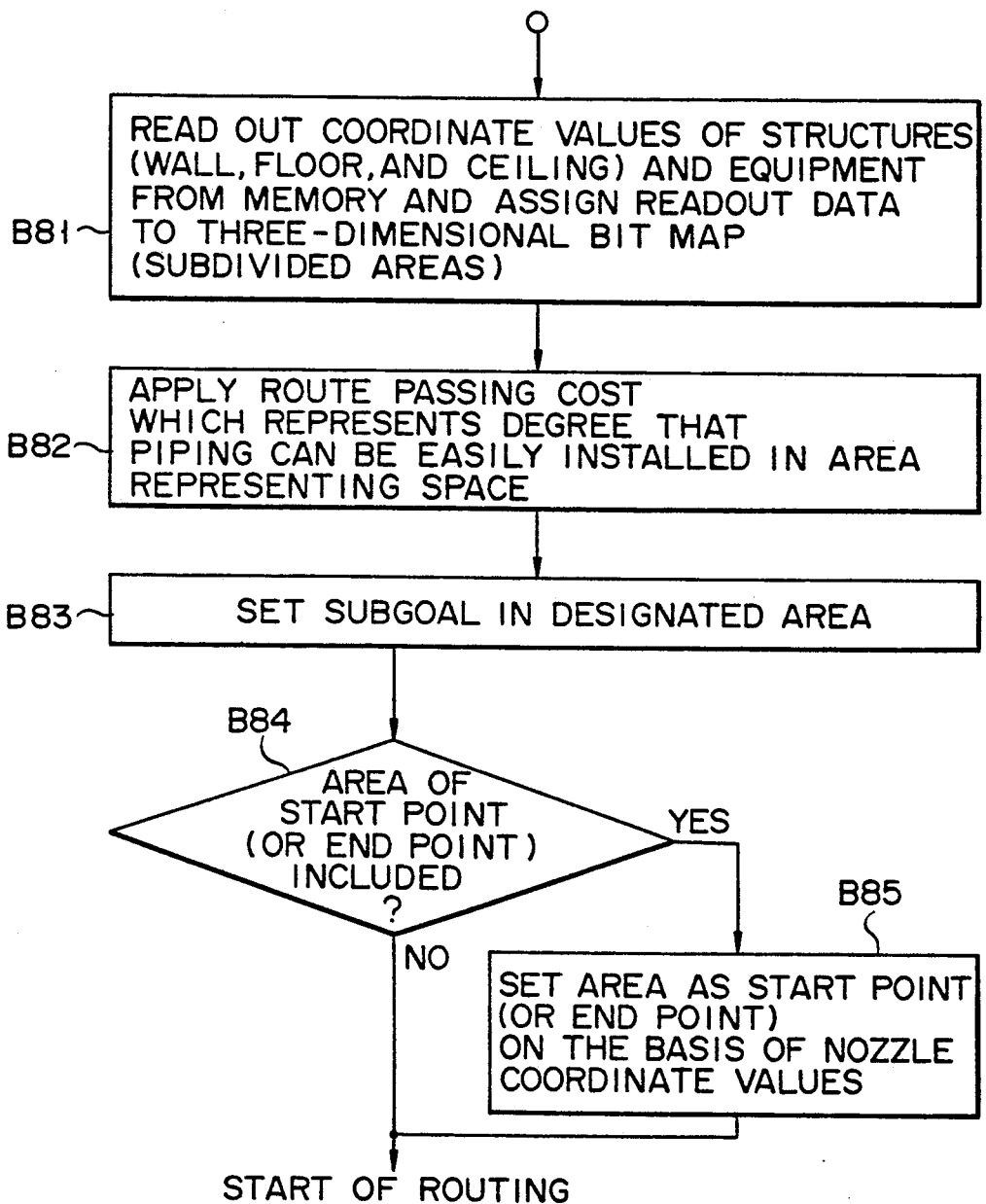

FB8: A three-dimensional bit map is prepared for three divided areas which are then subdivided in step FB7. The map is formed by procedures in a flow chart of FIG. 19. Coordinate values of building structures (e.g., wall, floor, ceiling, and beam) and equipment are read out from the memory, and the readout data are assigned to the corresponding subdivided areas (step B81). Route passing cost data representing the degree of ease in piping is assigned to a subdivided area located in a space in which no obstacle is present (step B82). For example, low cost data is assigned to a wall portion to easily mount a support. A virtual end point, i.e., a subgoal is set in the third divided area (step B83). The subgoal may be set anywhere within the area but is actually set at a point nearest an area which serves as a geometric end point. If an area has a start or end point, the start point is set to be the equipment position connected to the piping, e.g., the start point based on the coordinate values of a nozzle (steps B84 and B85).

FB9: Routing up to the subgoal is performed by using a routing technique such as a lattice development method. In this embodiment, as shown in FIG. 15, the route in only the first room (nearest to the start point) of the three rooms is determined. FIG. 15 shows a confirmed route 44. Equipment 45 serving as the start point and equipment 46 serving as an obstacle are also illustrated in FIG. 15.

FB10: It is determined whether the subgoal coincides with a true goal. If a coincidence is established, routing is completed. However, if no coincidence is established, the flow advances to step FB11.

Figure 20:
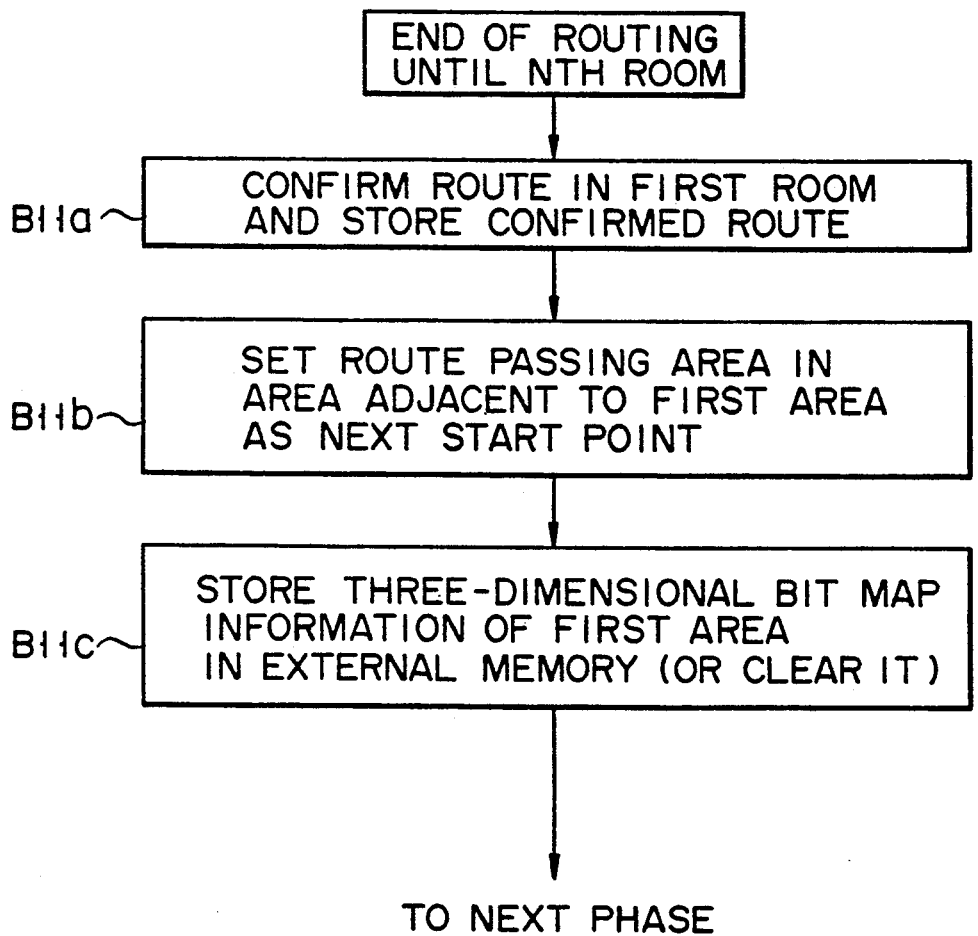

FB11: Postprocessing of routing up to the Nth room is performed. This processing is performed by procedures in a flow chart of FIG. 20. More specifically, the confirmed route 44 is stored in the memory (step B11a). The route passing subdivided area of the next room (i.e., the second room in this case) is defined as a new routing start point (step B11b). Information of the route-determined room (area) is stored or cleared as needed (step B11c).

FB12: The next divided area (i.e., the fourth room in this case) is divided into subdivided areas, and the flow returns to step FB8. FIG. 16 shows a state wherein processing advances up to step FB9. In this case, the route 44 up to the second room is determined.

The route 44 for piping is determined as shown in FIG. 18 through a state of FIG. 17 by performing the same operations as described above.

In the above embodiment, the N areas are sequentially selected, the route of the first area of the N areas is determined, and the subsequent routes are determined in the same manner as described above. However, a route up to the Nth area may be determined in one step. Furthermore the present invention is not limited to routing for piping, but is equally applicable to wiring routing in electronic circuits and layout routing in equipment in a plant.

When the routing system is used to support piping design in plants and wiring design of electronic circuits, a plurality of routes must be set within a single object area.

When routing for a plurality of piping systems is performed in a conventional routing system described in Japanese Patent Disclosure (Kokai) No. 60-79470 or 62-114061, a routing priority order is given to the piping systems, and the first-priority piping route is determined by the maze method or the A-star algorithm. Subsequently, piping of the first-priority route is regarded as an added obstacle, and then a piping route having the second priority is determined. The routes of other piping systems are determined in the same manner as described above.

According to these conventional routing methods, piping of the previously obtained route is regarded as an obstacle, and therefore the subsequent piping systems must detour the previous piping route, thereby preventing interference between piping routes. However, when routing of all the piping systems is completed and the routing result is evaluated, all the piping systems are not always arranged in optimal routes. More specifically, the actual routes are determined by a positional relationship between a given piping system and other piping systems and/or positions of obstacles which are present in a partial area in a target space. It is therefore inappropriate to solely determine the positional relationship by only the priority order during routing.

A routing system according to a third embodiment of the present invention can achieve well-balanced routing by adding limiting conditions of respective routes when routing of a plurality of routes is performed.

In this embodiment, in the first phase, the entire object area is defined as a route passing area, and optimal routes for a plurality of routes are independently obtained. In the second phase, the route passing area is divided into a plurality of segmented areas. The relative positional relationship which satisfies the predetermined limiting conditions in each combination of two of all the routes included in each segmented area is obtained. The positions, i.e., coordinate values of all the routes within each segmented area are determined on the basis of the positional relationship. The above operations are repeated in units of segmented areas, thereby determining the entire route.

In the above routing system, each piping system is routed in the entire space of the object area as the route passing area without considering other piping systems, thereby independently obtaining optimal routes of all the piping systems. In this case, the optimal routes may interfere with each other at specific locations. No special countermeasure is made against this interference. The optimal routes are temporarily stored in the memory. The above operations are performed in the first phase.

The route passing area is divided into a plurality of segmented areas. All the optimal piping routes located in each segmented area are read out and are rearranged by using the optimal routes and their attributes in accordance with knowledge information in a knowledge data base created on the basis of knowledge of a designer. In this case, a relative positional relationship which satisfies the limiting conditions in each route, and the coordinate values of all the piping systems within each segmented area are determined on the basis of the relative positional relationship. The above procedures are repeated in units of segmented areas, and the piping route within each segmented area is determined. The above operations are performed in the second phase.

Routing can be performed without reference to priority, thereby achieving well-balanced routing.

An arrangement of the routing system according to the third embodiment of the present invention is shown in FIG. 21.

A computer-aided design system 50 aims at searching a piping route and comprises a first memory 51, a second memory 52, a third memory 53, a fourth memory 54, a central processing unit (to be referred to as a CPU hereinafter) 55, an input unit 56, an output unit 57, a display unit 58, a printer 59, and a fifth memory 60.

The first memory 51 stores data associated with design specifications of various piping systems. The second memory 52 stores space data representing the space of the object area, that is, environment data such as the presence/absence of an obstacle, and its size, position, and attributes. The third memory 53 stores limiting conditions, i.e., design standard data, which must be satisfied in decision of each piping route. The fourth memory 54 stores processing procedures required until each piping route is determined. The CPU 55 performs arithmetic operations and processing which are required to determine a piping route in accordance with processing procedures stored in the fourth memory 54. The input unit 56 is used by an operator to input information to the CPU 55. An information output such as a processing result from the CPU 55 is output to any one of the display unit 58, the printer 59, and the fifth memory 60 through the output unit 57. The display unit 58 is primarily used to output information presented to the operator. For example, the display unit 58 displays the processing result of the CPU 55. The printer 59 prints out the output information. The fifth memory 60 properly stores the processing result from the CPU 55 through the output unit 57.

Procedures for searching a route for installing a plurality of piping systems in a given space by using the CAD system 50 having the above arrangement will be described below.

The operator inputs a name of an object space area such as a name of a building and a plurality of piping names from the input unit 56. The name of design reference data and the like are also input at this time, as needed.

Figure 22B:
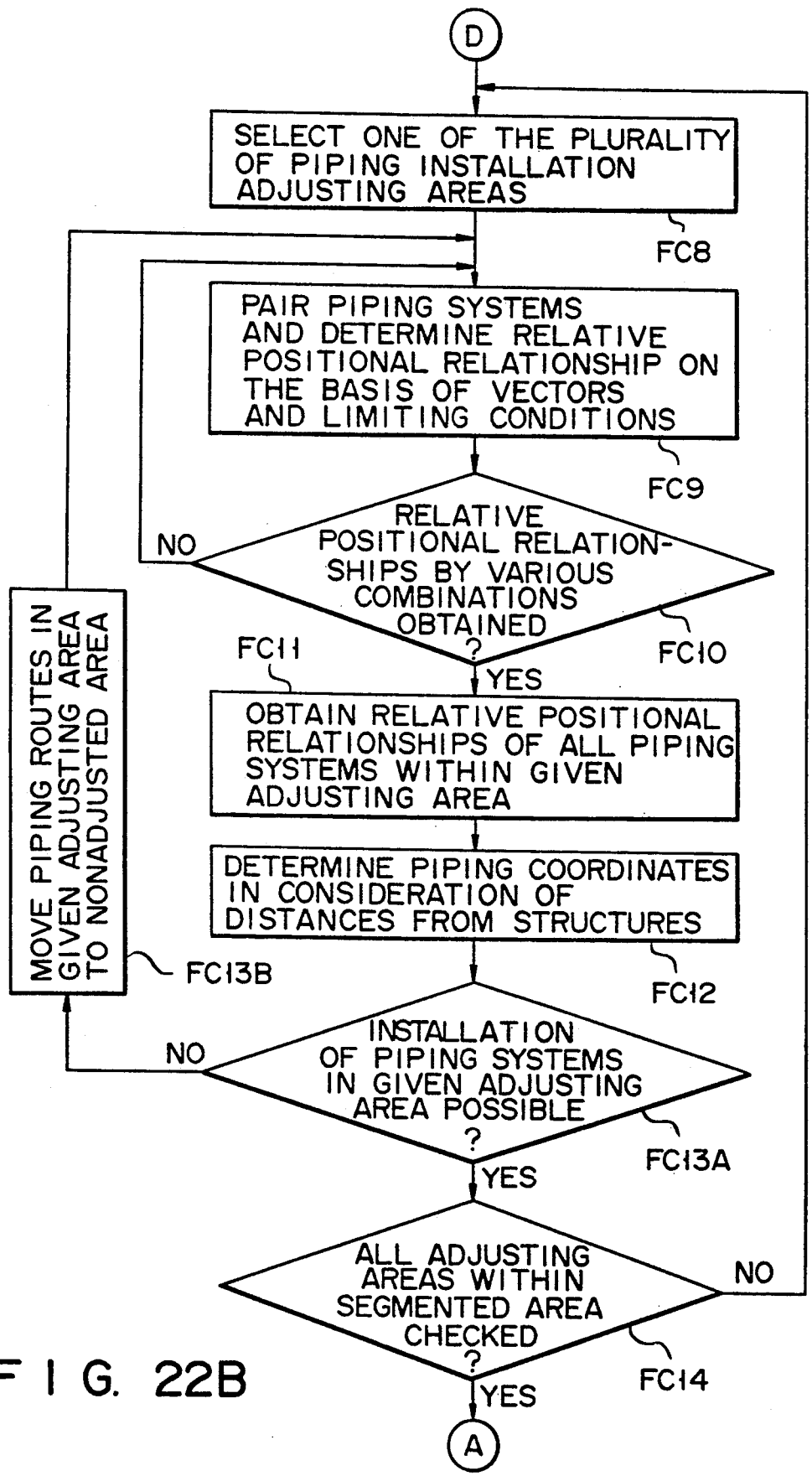

After the input operations are completed and processing is started, the CPU 55 performs processing by the procedures shown in flow charts of FIGS. 22A, 22B, and 23 in accordance with programs stored in the fourth memory 54.

FC1: The environment data of the object space, i.e., structures of a building as an object, positions, shapes, and attributes of already installed equipment, and accessories are read out from the second memory 52 under the control of the CPU 55.

FC2: Data of all designated piping systems are read out from the first memory 51 under the control of the CPU 55.

FC3: The CPU 55 searches optimal piping routes (paths) in the piping installation area in the building by using the design reference data stored in the third memory 53, i.e., the limiting condition data for installing each piping system and the individual piping data, in accordance with the maze method or the A-star algorithm as a known routing technique. These optimal routes are stored in the fifth memory 60 as virtual routes. In this case, the optimal route of each piping system is independently determined without considering optimal routes of other piping systems.

FC4: The operations in step FC3 are performed until optimal routes of all designated piping systems are determined.

The above operations are performed in the first phase, and the following operations for adjusting layout due to interference are performed in the second phase.

FC5: All data associated with the piping routes are read out from the fifth memory 60. The readout piping route is shown in FIG. 24. In a building 70 constituting an object space, a piping system 73 installed to connect equipment 71 and equipment 72 and a piping system 76 installed to connect equipment 74 and equipment 75 partially interfere with each other in an area 77. FIG. 25 shows an interfering portion and its vicinity.

FC6: The space as the object area, i.e., a building is segmented into a plurality of areas (rooms in this case), and one of the segmented areas is selected.

Figure 26:
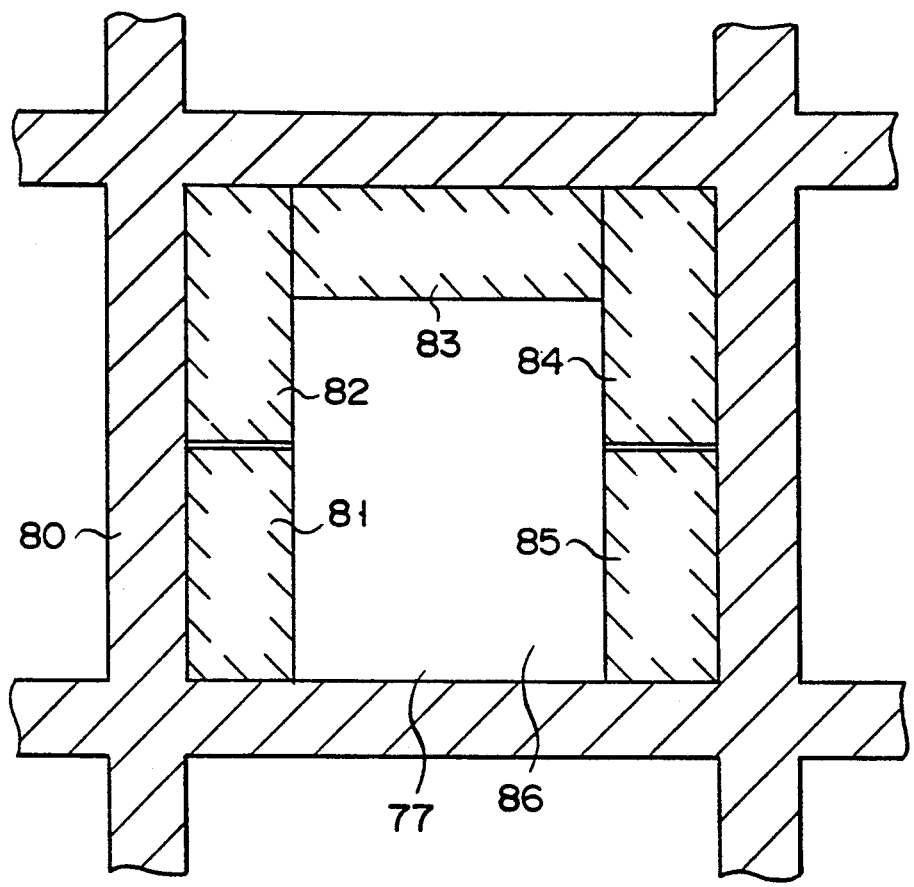
FIG. 26 is a sectional view of the segmented area.

FC7: If the segmented area selected in step FC6 is, e.g., the area 77, the area 77 is further subsegmented into a plurality of piping installation adjusting areas. FIG. 26 shows the section of the area 77. That is, the area 77 is subsegmented into a plurality of piping installation adjusting areas 81 to 86 due to the following reason. Piping is desirably installed near a structure 80 for easy support, and it is highly probable that the temporary routes obtained in step FC3 are located within the piping installation adjusting areas 81 to 86.

FC8: One of the plurality of piping installation adjusting area segmented in step FC7 is selected.

FC9: All of the piping systems within the adjusting area selected in step FC8 are paired. A correction plan of the relative positional relationship of the paired piping systems is obtained to satisfy the piping limiting conditions stored in the third memory 53. This processing is performed for every pair of all the piping systems within the adjusting areas. The design standard data representing the piping limiting conditions and stored in the third memory 53 have the following contents.

(1) A piping system is installed to minimize its installation length in consideration of input and output vectors of the segmented area.

(2) When a piping system is vertically installed on a wall side, a large-diameter pipe is located below a small-diameter pipe. When large- and small-diameter pipes are installed parallel to each other, the large-diameter pipe is located closer to the wall than the small-diameter pipe.

(3) A piping system having a higher earthquake-resistance is located above piping having a lower earthquake-resistance.

(4) Piping systems are located such that valves and specialties are located in an access or maintenance space.

(5) Piping systems are located not to overlap structures, equipment, the access space, the maintenance space, and the like.

(6) Piping systems are located to satisfy piping functions.

(7) Piping systems are located to assure predetermined distances between the structure and the piping system and between the piping systems.

FC10: Processing in step FC9 is performed for all pairs of the piping systems within the adjusting areas.

Figure 27:
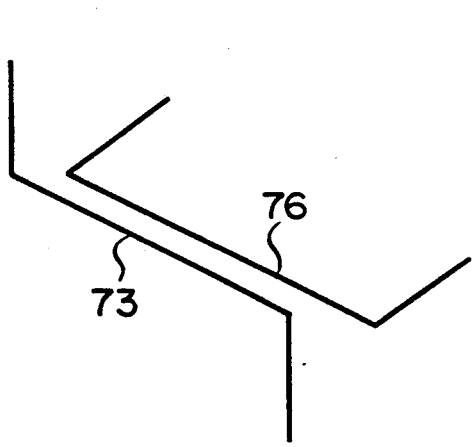
FIG. 27 is a view showing piping positions in the segmented area in FIG. 25.

FC11: The design standard data are referred to with respect to all piping systems within the adjusting area to obtain a relative positional relationship which satisfies limiting conditions. For example, in the area 77 where the piping systems 73 and 76 interfere with each other, as shown in FIG. 25, a correction plan is generated to obtain a relative positional relationship so as to prevent interference between the two piping systems 73 and 76 which satisfy the limiting conditions, as shown in FIG. 27.

Figure 28:
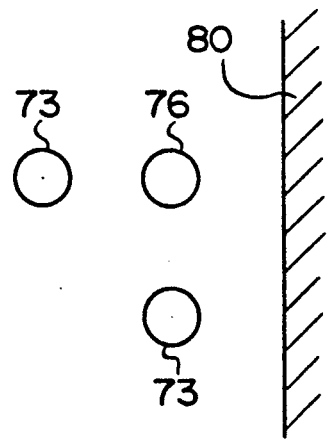
FIG. 28 is a view showing a relative piping position when piping coordinates are adjusted and determined.

FC12: The relative positional relationship between the piping and the structure 80 is determined on the basis of the correction plan associated with the relative positional relationship obtained in step FC11, thereby determining coordinates. When the piping systems 73 and 76 are bent, as shown in FIG. 27, the piping system 73 can be arranged at one of the two location shown in FIG. 28.

In this case, since a step is formed between this segmented area and other segmented area, the piping system 73 located in other segmented area must be moved as described above. After the coordinate value of the piping systems 73 and 76 in the adjusting area 77 is determined, coordinates of the piping systems 73 and 76 in the adjacent area are determined.

FC13A: It is determined on the basis of the limiting conditions and the like whether the piping system can be installed within the adjusting area.

FC13B: If not, the piping system is moved to another adjusting area. The operations in steps FC9 to FC12 are repeated for the new adjusting area in which the piping system is moved.

FC14: The operations in steps FC8 to FC13A are performed for all adjusting area within the segmented area 77 to determined all coordinates of the piping route.

FC15A: It is determined whether all piping systems can be installed within the adjusting areas of the segmented area 77.

FC15B: If all the piping systems cannot be installed in the adjusting areas set in the segmented area 77, the adjusting area of this segmented area 77 are marked as areas for inhibiting installation of the piping systems. The operations are started again from step FC1.

FC16: It is checked whether the positions of the piping systems in all the segmented areas in the building 70 are determined. If not, the operations in steps FC6 to FC15A are performed to arrange the piping systems in segmented areas whose piping positions are not determined. When the piping positions in all the segmented areas of the building 70 are determined, a piping route which prevents interference between the piping systems 73 and 76 is determined, and routing is ended.

FC17: The coordinates representing the positions of the piping route within the building 70 are stored in the fifth memory 60, and processing is completed.

In the above method, since the piping routes determined in accordance with the priority order are dealt as obstacles, routing must be performed for each pipe in principle. The only way to increase the routing speed is to improve hardware performance.

A routing system arranged in consideration of the above problem according to a fourth embodiment performs efficient routing on the basis of parallel routing processing.

In the routing system, the routing processing is divided into a first phase for independently obtaining optimal paths by allowing interference between the routes and a second phase for adjusting the arrangements on the basis of the result of the first phase and determining final coordinate values.

In the first phase, since the interference between the routes is allowed, processing can be parallel processing. A plurality of parallel routing processors are arranged under the control of a control processor to perform efficient routing.

Parallel optimal routing of the individual piping systems is performed by allowing interference between the piping systems in the first phase. Routing adjustment is performed in the second phase. Therefore, more efficient routing can be achieved.

A system arrangement of the fourth embodiment in which the routing system of the present invention is applied as a piping routing system in a plant is shown in FIG. 30, and a flow of processing of the first phase as a characteristic part of this system is shown in a flow chart of FIG. 31.

This routing system comprises a memory 91 for storing data of structures constituting the object area, parallel routing processors 92-1, 92-1, ... 92-N, and a control processor 93 for controlling the memory 91 and the routing processors 92-1, 92-2, ... 92-N.

Processing of the above routing system will be described with reference to the flow chart in FIG. 31.

FD1: Data of structures such as a wall, a floor, and a ceiling, and equipment within the object space are read out from the memory 91 and stored in the control processor 93.

FD2: The structure data stored in step FD1 are transferred from the control processor 93 to all the routing processors 92-1 to 92-N.

FD3: Piping data subjected to a routing object are read out from the memory 91 and stored in the control processor 93.

FD4: The piping data are supplied from the control processor 93 to available processors included in the routing processors 92-1 to 92-N.

FD5: At the end of routing, routing results are supplied from the routing processors 92-1 to 92-N to the control processor 93.

FD6: It is checked whether unconnected pipes are present. If YES in step FD6, the flow returns to step FD4 to perform next piping routing since an available routing processor is present as determined in step FD5.

FD7: If no nonconnected pipe is found, it is determined that routing of all piping systems is completed. If NO in step FD7, the flow returns to step FD5 and sends the routing results to the control processor 93 at the end of routing since the routing processors 92-1 to 92-N are kept operated.

FD8: When routing of all piping systems is completed, the routing results are supplied from the control processor 93 to the memory 91 and stored therein, thereby completing the first phase.

In the second phase, an appropriate technique such as the same method as in the third embodiment is employed to appropriately perform adjustment.

The method of the present invention is not limited to the specific form described above. In each embodiment described above, piping routing is performed. However, the method of the present invention is also applicable to routing for wiring design in buildings and electronic circuits.

What is claimed is:

1. A routing method for finding a route to satisfy piping conditions within a three dimensional space of an object area with the aid of a computer, said method comprising:
   a first step of dividing at least the object are into a plurality of three-dimensional rooms and extracting continuous three-dimensional rooms disposed between a start point and an end point which satisfy the piping conditions from the plurality of three-dimensional rooms, to determine a rough zone of a specific target route; and
   a second step of determining a temporary end point disposed between said start point and said end point in one room which is ahead relative to the start point by an arbitrary number of rooms includes in the rooms extracted in the first step, further dividing each room extending to the temporary end point into a plurality of sub-rooms, extracting continuous sub-rooms which satisfy the piping conditions from the plurality of sub-rooms, to determine part of a specific target route, and repeating the above steps to determine the specific target route from said start point to said end point throughout said object area.

2. A routing method of finding a plurality of routes which satisfy predetermined limiting conditions in a space of an object area with the air of a computer, comprising:
   a first phase of independently obtaining optimal routes for a plurality of routes in the entire object area as a route passing area without considering interference between the optimal routes; and
   a second phase of segmenting the route passing area into a plurality of segmented areas, obtaining relative positional relationships of said routes which satisfy the predetermined limiting conditions in each combination of two of the optimal routes which are obtained in the first phase and included in each segmented area, determining coordinate values of all routes within all the segmented area on the basis of the relative positional relationships, and repeatedly determining each route in each segmented area.

3. A method according to claim 2, wherein the second phase includes the step of shifting a route portion within one segment area in one direction and sifting at least part of a route portion which is within a segment area adjacent to said one segment area in said one direction, so as to determine the coordinate values of a given route.

4. A method according to claim 2, wherein the first phase includes the step of obtaining the plurality of routes by parallel processing.

5. A routing system comprising:
   means for storing possible route passing data associated with a three-dimensional space of an object area; and
   routing processing means for searching, based on the storage data in said storing means, a specific three dimensional space which is defined by start and end points designated in the object area and which satisfies a set of piping conditions,
   said routing processing means including:
   first means for dividing at least the object area into a plurality of three-dimensional rooms disposed between a start point and an end point, and extracting continuous three-dimensional rooms which satisfy the piping conditions from the plurality of three-dimensional rooms to determine a rough zone of a specific target route, and
   second means for determining a temporary end point disposed between said start point and said end point in one three-dimensional room which is ahead relative to the start point by an arbitrary number of three-dimensional rooms included in the three-dimensional rooms extracted by said first means, further dividing each three-dimensional room extending to the temporary end point into a plurality of sub-rooms, extracting continuous sub-rooms form the plurality of sub-rooms to determine part of a specific target route, and repeating performance of the above functions of said second means to determine the single specific target route from said start point to said end point throughout said object area.

6. A routing system comprising:
   means for storing possible route passing data associated with a space of an object area; and
   routing processing means for searching a route which satisfies predetermined limiting conditions within the object area on the basis of the possible route passing data stored in said storing means,
   said routing processing means comprising:
   route setting means for independently obtaining optimal routes for a plurality of routes in the entire object area as a route passing area without considering interference between the optimal routes; and
   route adjusting means for segmenting the route passing area into a plurality of segmented areas, obtaining relative positional relationships of said routes which satisfy the predetermined limiting conditions in each combination of two of the optimal routes which are obtained by said route setting means and included in each segment area, determining coordinate values of all routes within all the segmented areas on the basis of the relative positional relationships, and repeatedly determining each route in each segmented area.

7. A system according to clam 6, wherein said route setting means comprises a plurality of means, arranged in parallel with each other, for independently obtaining the optimal routes.

8. A routing method for finding a piping route to satisfy piping conditions within a three dimensional space of an object area with the aid of a computer, said method comprising:
   a first step of dividing at least the object area into a plurality of three-dimensional rooms and extracting continuous three-dimensional rooms which satisfy the predetermined limiting conditions from the plurality of three-dimensional rooms;

a second step of determining a routing zone which satisfies the piping conditions and which has a predetermined width measured from border walls of the three-dimensional rooms; and a third step of determining a specific target piping route in the routing zone so that the specific target piping route satisfies the piping conditions.

9. A method according to claim 8, wherein the third step includes the step of locating a route of a large-diameter pipe below a route of a small-diameter pipe in the case where a plurality of routes is vertically installed in the routing zone.

10. A method according to claim 8, wherein the third step includes the step of locating a route of a large-diameter pipe closer to a border wall of the three-dimensional room than a route of a small-diameter pipe in the case where a plurality of routes are situated parallel to each other in the routing zone.

11. A method according to claim 8, wherein the third step includes the step of locating a route of a pipe having a higher earthquake-resistance above a route of a pipe having a lower earthquake-resistance in the case where a plurality of routes is installed in the routing zone.

12. A routing method for finding a route to satisfy predetermined limiting conditions within a space of an object area with the aid of a computer, said method comprising:

a first step of dividing at least the object area into a plurality of divided areas and extracting continuous divided areas disposed between a start point and an end point which satisfy the predetermined limiting conditions from the plurality of divided areas, to determine a rough zone of a specific target route; and a second step of determining a temporary end point disposed between said start point and said end point in one divided area which is ahead relative to the start point by an arbitrary number of divided areas included in the divided areas extracted in the first step;

a third step of dividing each divided area extending to the temporary end point into a plurality of subdivided areas, extracting continuous subdivided area which satisfy the predetermined limiting conditions from the plurality of subdivided areas, to determine part of a specific target route;

a fourth step of defining the subdivided area nearest to the temporary end point as a new start point and a new temporary end point between said now start point and said end point, and extracting continuous subdivided areas which satisfy the predetermined limiting conditions from said subdivided area, to determine another part of the specific target route; and a fifth step of repeating the above steps to determine the specific target route from said start point to said end point throughout said object area.

13. A routing system comprising:

means for storing possible route passing data associated with a space of an object area; and routing processing means for searching, based on the storage data in said storing means, a specific route which is defined by start and end points designated in the object area and which satisfies predetermined limiting conditions, said routing processing means including:

first means for dividing at least the object area into a plurality of divided areas disposed between a start point and an end point, and extracting continuous divided areas which satisfy the predetermined limiting conditions from the plurality of divided areas, to determine a rough zone of a specific target route, second means for determining a temporary end point disposed between said start point and said end point in one divided area which is ahead relative to the start point by an arbitrary number of divided areas included in the divided areas extracted by said first means, third means for dividing each divided area extending to the temporary end point into a plurality of subdivided areas, extracting continuous subdivided areas from the plurality of subdivided areas to determine part of a specific target route, fourth means for defining the subdivided area nearest to the temporary end point as a new start point and a new temporary end point between said new start point and said end point, and extracting continuous subdivided area which satisfy the predetermined limiting conditions from said subdivided areas, to determine another part of the specific target route;

fifth means for repeating performance of the above functions to determine the single specific target route from said start point to said end point throughout said object area.

* * * * *